(12) United States Patent
Stupar et al.

(10) Patent No.: US 6,432,250 B1
(45) Date of Patent: Aug. 13, 2002

(54) METHOD OF ARRANGING MULTILAYER PASSIVE ELECTRONIC COMPONENTS

(75) Inventors: Joze Stupar, Zuzemberku; Anton Konda, Zuzemberk, both of (SI)

(73) Assignee: Keko Oprema, d.o.o., Zuzemburg (SI)

( * ) Notice: Subject to any disclaimer, the term of this patent is extended or adjusted under 35 U.S.C. 154(b) by 0 days.

(21) Appl. No.: 09/485,078

(22) PCT Filed: Jun. 4, 1999

(86) PCT No.: PCT/SI99/00016

§ 371 (c)(1),
(2), (4) Date: Feb. 2, 2000

(87) PCT Pub. No.: WO99/62703

PCT Pub. Date: Dec. 9, 1999

(51) Int. Cl.[7] ............................................. B32B 31/00
(52) U.S. Cl. .................. 156/259; 156/267; 156/269; 156/285; 156/581
(58) Field of Search ............................. 156/250, 259, 156/267, 269, 285, 580, 581, 583.1

(56) References Cited

U.S. PATENT DOCUMENTS

| | | | | |
|---|---|---|---|---|
| 4,255,077 A | * | 3/1981 | Smith | 414/786 |
| 4,995,933 A | * | 2/1991 | Brussel | 156/247 |
| 5,019,200 A | * | 5/1991 | Kawabata et al. | 156/245 |
| 5,470,193 A | | 11/1995 | Miura et al. | 414/774 |
| 5,827,382 A | | 10/1998 | Ogawa et al. | 156/64 |
| 5,879,500 A | * | 3/1999 | Herrin et al. | 156/204 |

FOREIGN PATENT DOCUMENTS

| | | | | |
|---|---|---|---|---|
| DE | 1173 784 | | 7/1964 | B54D/2/01 |
| DE | 3345 877 A1 | | 6/1985 | B23Q/7/00 |
| DE | 3941 346 A1 | | 6/1990 | H01G/13/00 |
| EP | 0 530 052 A1 | | 3/1993 | H01G/4/30 |
| FR | 2 387 567 | | 11/1978 | H05K/3/00 |
| FR | 2 578 484 | | 9/1986 | B31D/1/02 |
| FR | 2 633 549 | | 1/1990 | B26F/1/44 |
| JP | 09129502 | | 5/1997 | H01G/4/30 |
| JP | 10284346 | | 10/1998 | H01G/4/30 |

* cited by examiner

Primary Examiner—James Sells

(57) ABSTRACT

Subject invention provides method of arranging multiplayer passive electronic components, enabling simple arranging of rolled thin foil from a roll on a supporting block in order to form a stack, where supporting, plastic foil with thin foil (63) in it is led from unrolling mechanism (67) for unrolling the foil, over the cross knife (66) and over two rotating side knives (68), through the pressing tool (65), over the separating crossbar (610) and pulling mechanism (612) to the rolling mechanism (611) for rolling of the supporting foil, from which the this foil is already separated, where the supporting block (57) is put under the pressing tool (65). The invention also provides the supporting block.

20 Claims, 6 Drawing Sheets

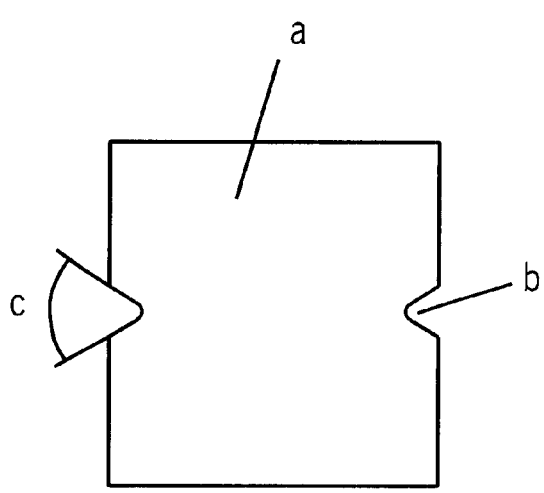
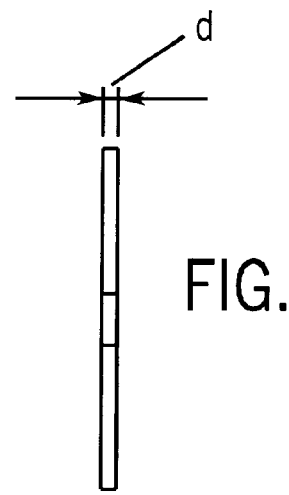
FIG. 3A  FIG. 3B
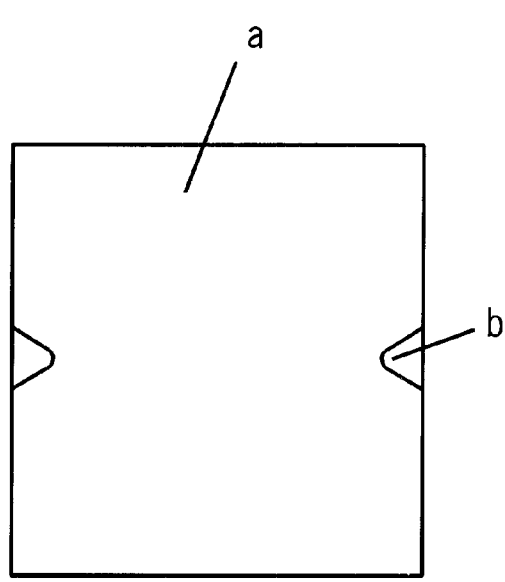
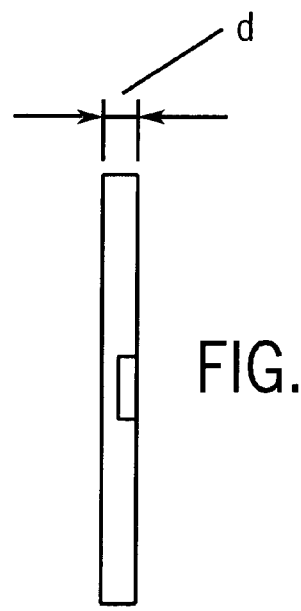
FIG. 4A  FIG. 4B

METHOD OF ARRANGING MULTILAYER PASSIVE ELECTRONIC COMPONENTS

FIELD OF INVENTION

This invention belongs to the field of manufacturing electronic components. More specifically it belongs to the field of arranging multilayer passive electronic components e.g. ceramic condensers, varistors, inductors, etc., composed or arranged from relatively thin layers.

TECHNICAL PROBLEM AND STATE OF THE ART

Improvement of multilayer electronic component characteristics normally requires decreasing of layer thickness and increasing of number of layers. Usually thin layer of ceramic or other material is brought onto supporting substrate, normally a plastic foil.

Separation of such thin layer from the supporting foil and arranging into a stack is practical problem, becoming even greater when thinner layers are applied. Another problem is precise placement of each of electrode layers against other electrode layers, especially when the number of layers is large.

SHORT DESCRIPTION OF DRAWINGS

Figure 1:
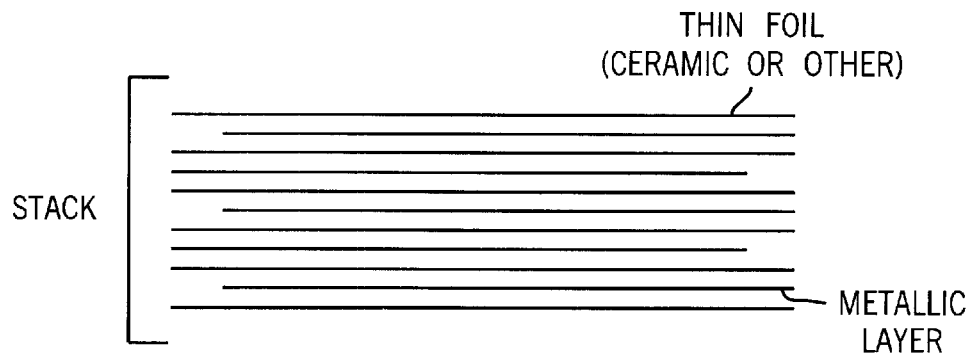

Subject invention is further described, with reference to the following drawings, which show:

FIG. 1: an example of composing multilayer ceramic condenser

Figure 2:
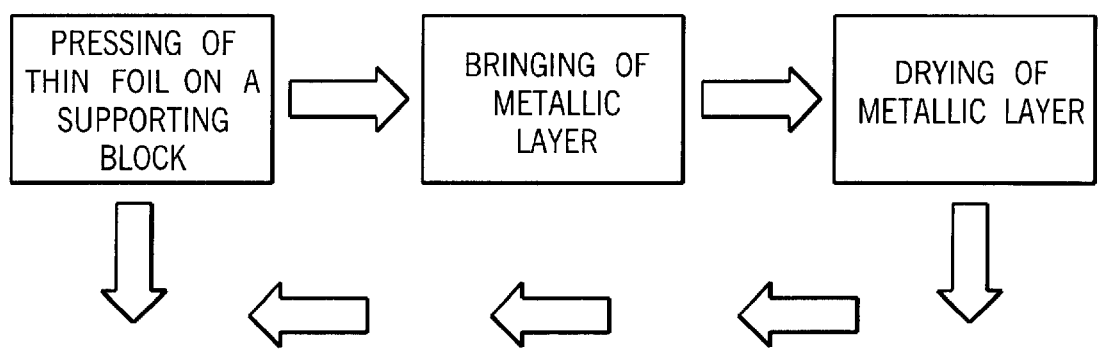

FIG. 2: procedure of arranging a stack

FIG. 3A: shape of centering grooves of thinner supporting block

FIG. 3B: side elevational view of that shown in FIG. 3A

FIG. 4A: shape of centering grooves of thicker supporting block

FIG. 4B: side elevational view of that shown in FIG. 4A

Figure 5A:
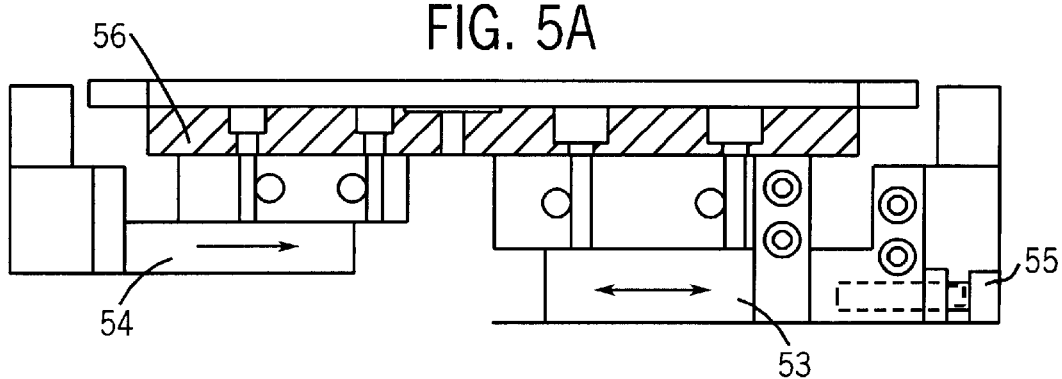
Figure 5B:
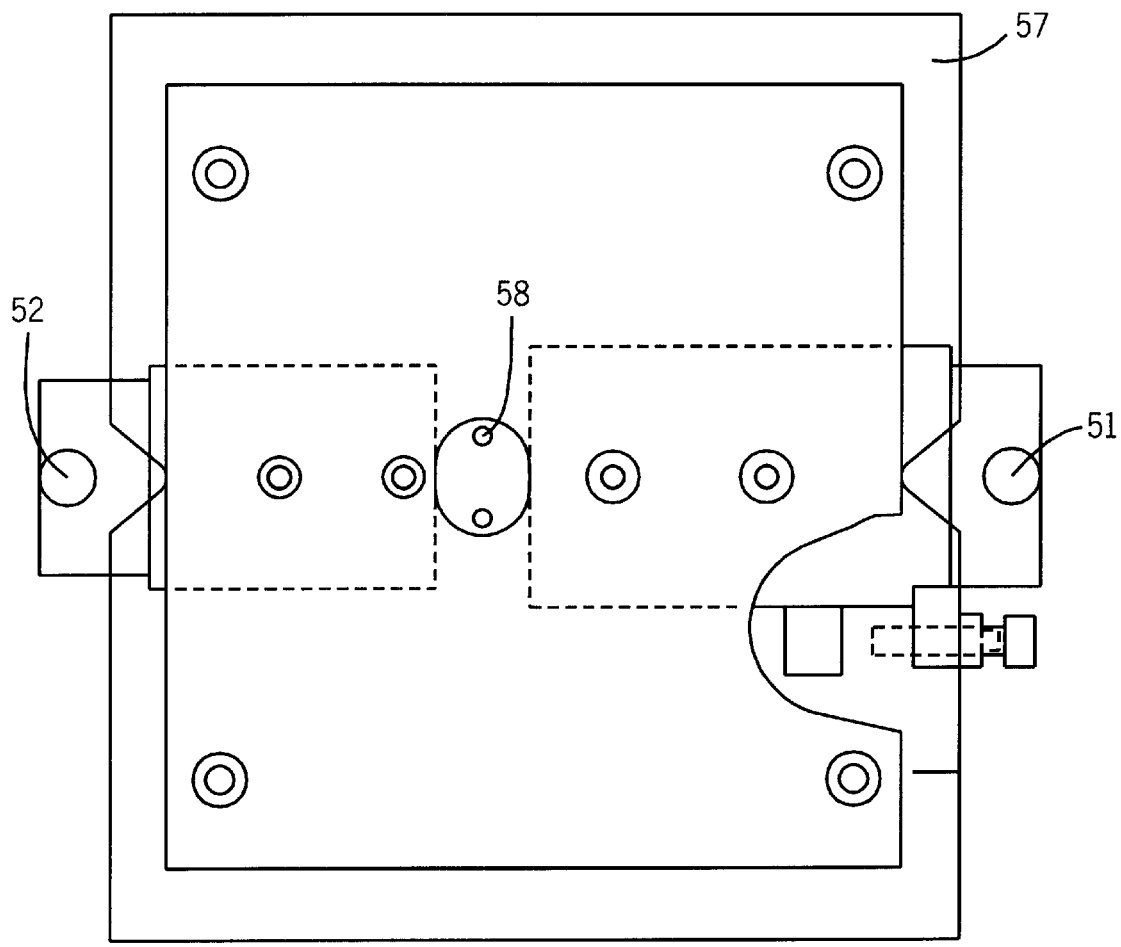

FIGS. 5A–5B: method of centering of supporting block

Figure 6:
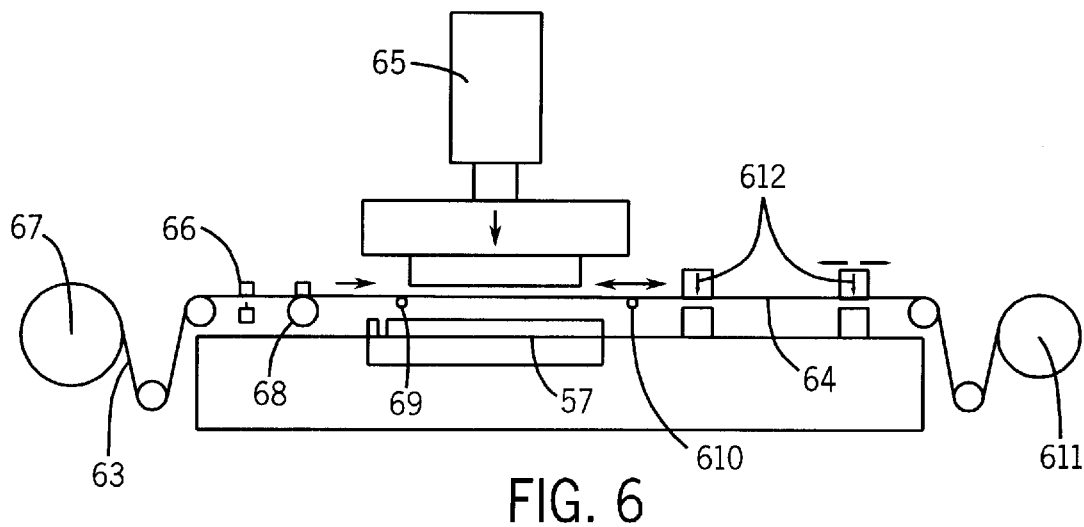

FIG. 6: composing of rolled thin foil onto a supporting block in a stack

Figure 7:
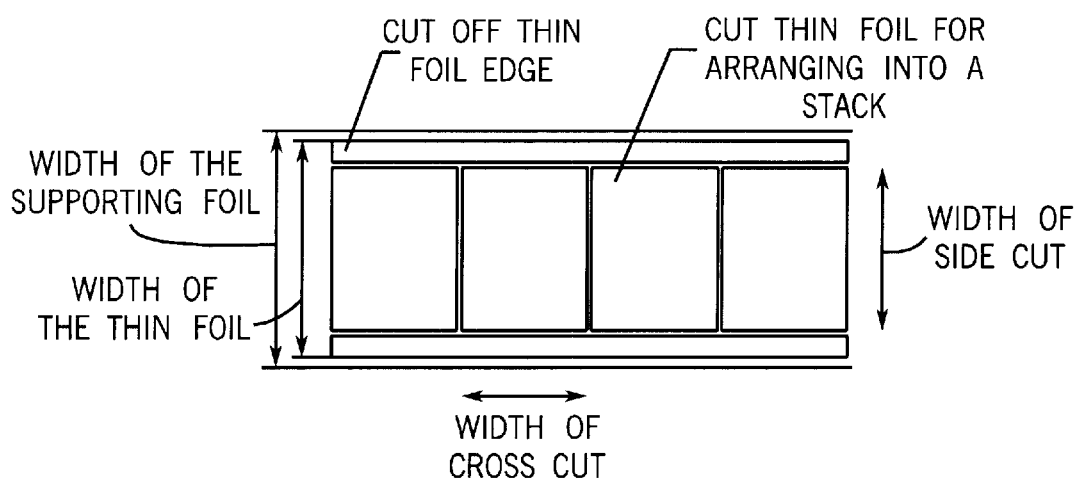
Figure 8A:
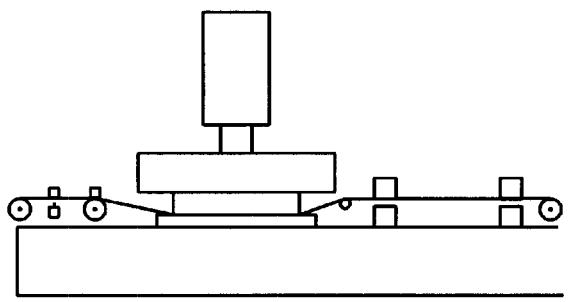
Figure 8B:
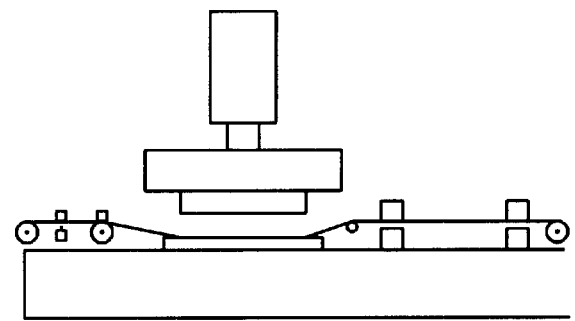
Figure 8C:
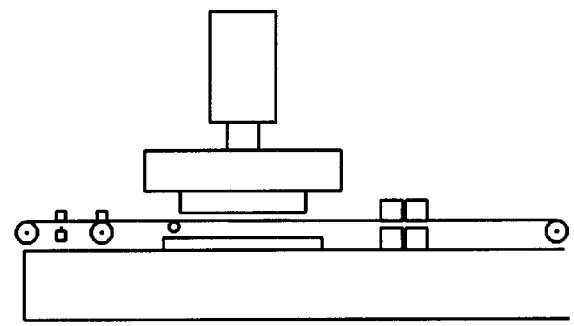
Figure 8D:
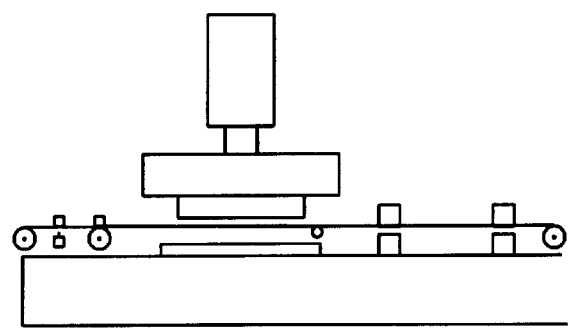

FIG. 7: cutting edges of foil on supporting foil for composing into a stack

FIGS. 8A–8D: perspective view of stack during steps of composition

Figure 9:
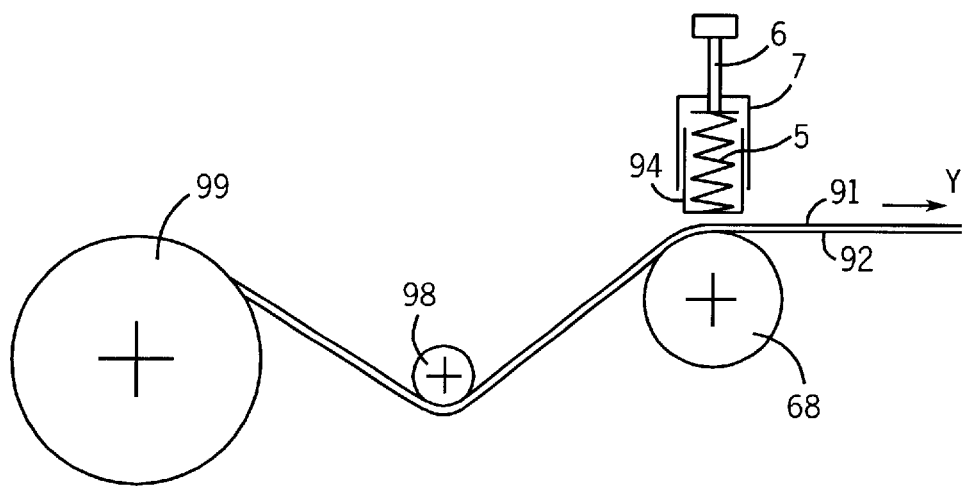

FIG. 9: thin foil longitudinal cutting

Figure 10:
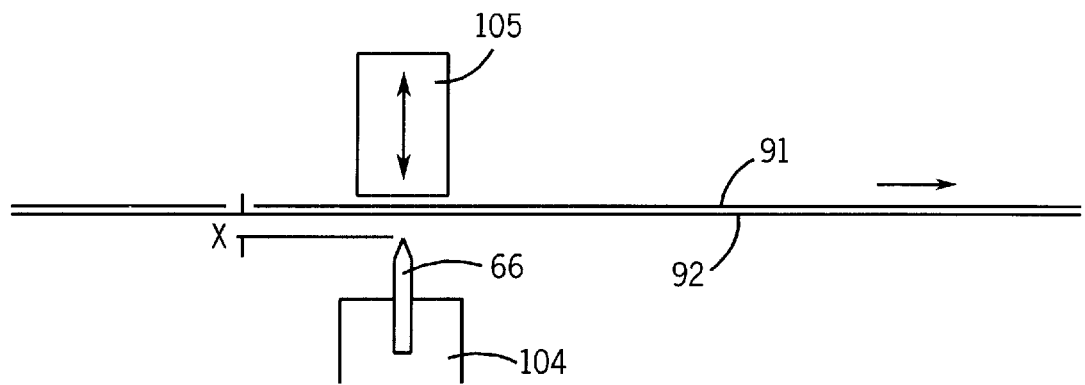

FIG. 10: thin foil cross cutting

DESCRIPTION OF THE INVENTION

Subject invention provides solution to the problem of arranging or composing of thin layers of multilayer electronic components and furthermore it provides precise placement of each of electrode layers against other electrode layers, also when the number of electrode layers is large.

FIG. 2 shows typical course of composing a stack according to the present invention. Each foil is pressed on a supporting block, after which a metallic layer is brought onto it, and the metallic layer is dried. These steps are then repeated, until the desired number of layers is reached.

FIGS. 3A and 3B schematically show a supporting block (a), which is a metallic plate of perpendicular shape. Dimensions of the supporting block are equal to or larger from dimensions of the stack. The supporting block has two symmetrical wedge-shaped centering grooves(b), one on each of two opposite sides, where the top of each wedge-shaped groove may be rounded up.

Said centering grooves (b) render possible positioning of the supporting block with positioning or also called centering bolts, during various operations are being carried out, like printing, foil arranging, product pressing, etc. The angle (c) of said centering wedge-shaped grooves (b) is between 15° and 120°, which provides reliable adjustment of centering bolts to a centering grooves (b). When the thickness (d) of supporting block (a) is smaller, centering grooves pass through the whole thickness (d) of the supporting block (a), as best shown in FIG. 3B. In case of larger thickness (d) of supporting block (a), the centering grooves (b) are formed only on the bottom side of the supporting block (a), as shown in FIGS. 4A and 4B.

FIGS. 5A and 5B show method for centering of supporting blocks, which are being deposited on a fastening plate (56), on each manufacturing station, where positioning and fastening of supporting block is being carried out in a manner as described below.

Two positioning bolts (51, 52) are precisely guided in two guiding elements (53, 54). The centering bolt (51) travels towards the supporting block (57) until it sits into a corresponding centering groove. A limitation element (55), which is in this example a screw, limits traveling distance of the centering bolt (51). When movement of the positioning bolt (51) is concluded the positioning bolt (52) begins to move towards the supporting block (57). When both positioning bolts (51, 52) sit in corresponding centering grooves the supporting block (51) is centered.

Supporting block (57) may be fastened onto a fastening plate (56) by means of suction, in which case at least one suction outlet (58) is provided perpendicularly through the supporting plate (56), which enables fastening of the supporting block (56) onto a fastening plate (57), by the means of vacuum. For fastening of larger supporting blocks onto a fastening plate (57), number of said outlets (58) is greater.

FIG. 6 shows method for simple arrangement of thin rolled foil in a stack on a supporting block. Supporting foil with thin foil (63) on it, is led from unrolling mechanism (67) for unrolling of supporting foil, over the cross knife (66) and over two side knives (68), through a pressing tool (65), over the separating crossbar (610) and pulling mechanism (612) to the rolling mechanism (611) for rolling of the supporting foil. Supporting block (57) is put under the pressing tool (65) in such manner, that a notch (69) on a thin foil (63) is positioned as shown in FIG. 6.

As shown in FIG. 7, thin foil is cut with cross knife (66) and longitudinally edged with rotating side knives (68).

According to above explanation of FIGS. 5A, 5B, and 6, arrangement of thin foil into a stack includes following steps, which are shown in FIGS. 8A–8D:

Step 1: Pressing of Thin Foil on a Supporting Block

Pressing toll presses thin foil, together with a supporting foil on a supporting block. Since the thin foil is relatively plastic and therefore slightly adhesive, it will stick onto the supporting block. If the foil lacks adhesiveness, thin layer of adhesive or wax will be put on the supporting block prior to the said pressing operation. Proper pressing force is achieved with pneumatic, hydraulic or mechanical power. Pressing force and pressing time are adjustable, so for example foils with different mechanical and/or other properties may be used.

Step 2: Opening of the Pressing Tool

After prearranged pressing time, the pressing tool opens, with the thin foil remaining stuck on a supporting block.

Step 3: Separation of Thin Foil from the Supporting Foil

Crossbar (610), shown in FIG. 6, for separation of thin foil from supporting foil moves to the left side, thus separating supporting foil from the thin foil, which remains stuck on the supporting block.

Step 4: Pulling of the Supporting Foil for One Division

After the thin foil has been separated from the supporting foil, pulling mechanism (612) pulls the supporting foil for one division towards the rolling mechanism. During the pulling operation rotating side knives (68) longitudinally edge the thin foil. When the pulling operation is completed, the cross knife (66) cuts the thin foil in cross direction.

Implementation of side edging and cross cutting is further described and shown below. The step of pressing (Step 1) may be repeated a number of times, while the thin foil is arranged one onto another, or on supporting blocks, which are after every new layer of thin foil transported to a workstation, where a metallic layer is put on, dried and transported back in the pressing tool, as shown in FIG. 2.

Surface of a pressing tool is shaped in such a manner to provide equal pressure over the whole surface, and may be plane or on the other hand it may follow irregular shape of the stack.

FIG. 9 schematically shows side edging of the thin foil. Purpose of this operation is:

side edging of the thin foil, to provide desired width cutting off the edge of the thin foil, due to uneven thickness of the foil edge, as shown in FIG. 7.

FIG. 9 shows supporting plastic foil (91), carrying thin foil (92), which is rolled on a roller (99) and under a straining weight (98) and over rotating side knives (68) led to a pulling mechanism (112) shown in FIG. 6. Pulling mechanism (112) pulls both foils in direction of arrow (Y) shown in the FIG. 9. The edge of cutting rotating knife (68) with it's sharp edge touches the thin foil, and due to a force provided by a push bar (94), which is placed in a housing (97), sharp edge of the knife (68) cuts the thin foil (92).

FIG. 10 shows cross cutting of thin foil, which may also be carried out in a combination with longitudinal cutting (i.e. edging) if so desired.

Cross cutting of the thin foil is implemented while between two movements of the foil, thus when the foil is in a stand still position, and provides perpendicularity of the parts cut out from the thin foil, and furthermore perpendicular shape of the stack.

Supporting plastic foil (91) with thin foil (92) on the lower side is stretched over the cross knife (66), which is with a knife handle (104) fastened on the machine housing. Distance (x) between the thin foil (92) and the cross knife (66), enables undisturbed movement of the foil. When the foil is not moving, a cross-push bar (1 05) moves downward, bends the foil and presses it against the cutting edge of a cross knife (66). The cross knife (66) cuts into and through the thin foil (92), while the supporting foil (91) remains uncut.

As shown in FIG. 7, the length of the cross cut between longitudinal cuts equals width of the cross cuts.

Purpose of above description of the subject invention is to illustrate the invention in the best way, and does not anyhow limit the scope of the invention. Skilled in the art will find different variations of the present invention. All such variations are within the scope and spirit of this invention. Scope of this invention is defined by the enclosed claims.

What is claimed is:

1. Method of arranging multilayer passive electronic components, enabling simple arranging of rolled thin foil from a roll on a supporting block in order to form a stack, where supporting, plastic foil with thin foil (63) in it is led from unrolling mechanism (67) for unrolling the foil, over the cross knife (66) and over two rotating side knives (68), through the pressing tool (65), over the separating crossbar (610) and pulling mechanism (612) to the rolling mechanism (611) for rolling of the supporting foil, from which the thin foil is already separated, where the supporting block (57) is put under the pressing toll (65).

2. Method of centering of supporting blocks, which provides precise arrangement of layers, characterized in that, that on each working station said supporting block (57) is put on the fastening plate (56), where the supporting block includes a pair of centering grooves (b), is positioned and fastened by the means of two centering bolts (51, 52), each of them being guided in corresponding guiding element (53, 54), where the centering bolt (51) travels towards the supporting block (57) first, and sits into a corresponding centering groove (b) of the supporting block (57), the movement of said centering bolt (51) being limited by a limitation element (55), and where after the movement of the centering bolt (51) is completed, the centering bolt (52) also travels toward the supporting block (57) and sits into a corresponding centering groove (b) of the supporting block (57), so when both centering bolts (51, 52) sit in their corresponding centering grooves (b) the supporting block is centered and positioned, the supporting block (57) may be fastened onto a fastening plate (56) by the means of suction, which is enabled by at least one suction vertical hole (58) passing through the fastening plate (56), which enables fastening of the supporting block (57) onto a fastening plate (56), by the means of a vacuum.

3. Method of centering of supporting blocks, which provides precise arrangement of layers according to claim 2, characterized in that, that when the supporting block (57) has larger dimensions, more than one suction hole (58) passes vertically through the fastening plate (56), where the number of vertical suction holes (58) depends on supporting block dimensions.

4. Method of longitudinal cutting of thin foil, characterized in that, that the supporting plastic foil (91) with thin foil (92) on it, is rolled on a roller (99) and under a straining weight (98) and over rotating side knives (68) led to a pulling mechanism (112), to the pulling mechanism (112), which pulls both foils in direction of arrow (Y), where the cutting rotating knife (68) with it's sharp edge touches the thin foil, and due to a force provided by a push bar (94), which is placed in a housing (97), sharp edge of the knife (68) cuts the thin foil (92) longitudinally.

5. Method of thin foil cross cutting, characterized in that, that supporting plastic foil (91) with thin foil (92) in it's lower side, is stretched over the cross knife (66), which is fastened on the machine housing, where the distance (x) between the thin foil (92) and the cross knife (66), enables undisturbed movement of the foil, and where the said method is implemented when the foil is not moving in such a manner that a cross-push bar (105) moves downward, bends the foil and presses it against the cutting edge of a cross knife (66), which cuts into and through the thin foil (92), while the supporting foil (91) remains uncut.

6. Supporting block (a), characterized in that, that it is in a form of metallic plate of perpendicular shape, with dimensions equal to or larger from dimensions of the stack, with two symmetrical wedge-shaped centering grooves (b) on of each of two opposite sides, where the top of each wedge-shaped groove (b) may be rounded up, and the angle (c) of said grooves (b) is between 15° and 120°, which provides reliable adjustment of centering bolt to a corresponding centering groove (b) and where said two grooves (b) enable centering of the supporting block (a) with said two centering bolts.

7. Supporting block (a) according to claim 6, characterized in that that when the thickness (d) of the supporting block (a) is greater than a length of a centering bolt, centering grooves pass through the whole thickness (d) of the supporting block (a), and when the thickness (d) of supporting block (a) is less than the length of the centering bolt, the centering grooves (b) are formed only on the bottom side of the supporting block (a).

8. The method of claim 1 wherein the thin foil is formed of a relatively plastic material.

9. The method of claim 1 wherein the thin foil is comprised of a generally adhesive material.

10. The method of claim 1 further comprising the steps of adhesively securing the thin foil to the pressing toll.

11. The method of claim 1 further comprising the step of coating a layer of adhesive on a surface of the support prior to pressing action of the pressing toll.

12. The method of claim 1 further comprising the step of applying one of a pneumatic, a hydraulic, and a mechanical power to achieve proper pressing of the toll press.

13. The method of claim 2 wherein the limitation element includes a screw.

14. The method of claim 4 further comprising the step of cutting off an edge of thin foil, the edge having an uneven thickness.

15. The method of claim 4 further comprising the step of edging a side of the thin foil to provide a desired width of the thin foil.

16. The method of claim 5 further comprising the step of cross-cutting the thin foil between two movements of the foil.

17. The method of claim 16 further comprising the step of cross-cutting the thin foil to have a cross-cut length between longitudinal cuts equal to a width of the cross-cut.

18. The supporting block of claim 6 wherein the angle of said grooves is 90°.

19. The supporting block of claim 6 further configured to be suctionally fastened onto a fastening plate.

20. The supporting block of claim 6 further configured to support at least one foil under pressure.

* * * * *